(12) United States Patent
Pracas

(10) Patent No.: US 6,412,181 B1
(45) Date of Patent: Jul. 2, 2002

(54) CUTTING TOOL

(75) Inventor: Victor Manuel Pracas, Waroona (AU)

(73) Assignee: Tool Concepts PTY LTD (AU)

( * ) Notice: Subject to any disclaimer, the term of this patent is extended or adjusted under 35 U.S.C. 154(b) by 0 days.

(21) Appl. No.: 09/601,659

(22) PCT Filed: Feb. 5, 1999

(86) PCT No.: PCT/AU99/00075

§ 371 (c)(1),
(2), (4) Date: Oct. 25, 2000

(87) PCT Pub. No.: WO99/39857

PCT Pub. Date: Aug. 12, 1999

(30) Foreign Application Priority Data

Feb. 5, 1998 (AU) .............................................. PP 1663

(51) Int. Cl.⁷ .............................................. B23D 49/10
(52) U.S. Cl. ....................................................... 30/392
(58) Field of Search ......................... 30/392, 393, 394, 30/371, 289, 369, 241; 83/699.21

(56) References Cited

U.S. PATENT DOCUMENTS

| | | | |
|---|---|---|---|
| 2,914,099 A | * | 11/1959 | Kaufmann .................... 30/369 |
| 3,388,728 A | * | 6/1968 | Riley, Jr. et al. .............. 30/392 |
| 3,940,852 A | | 3/1976 | Ruf et al. |
| 3,942,250 A | | 3/1976 | Kurosaki |
| 5,644,847 A | * | 7/1997 | Odendahl et al. ............. 30/394 |
| 5,724,741 A | | 3/1998 | Bednar |

FOREIGN PATENT DOCUMENTS

AU          16102/92          11/1992

* cited by examiner

*Primary Examiner*—Hwei-Slu Payer
(74) *Attorney, Agent, or Firm*—Larson & Taylor, PLC

(57) ABSTRACT

A cutting tool comprises an elongate housing for slidably receiving a cutting blade. The cutting tool is in the form of an attachment for an electric jigsaw, and the housing incorporates a pair of clamping brackets for mounting on a footplate of the jigsaw. Each bracket is provided with a mounting flange for clamping onto the footplate when a compressive force is applied to move the clamping brackets towards each other. The cutting blade is driven by the jigsaw in a reciprocating manner. A workpiece support extends from a free end of the housing, and has a support member arranged to engage a workpiece in a stabilizing manner adjacent the free end of the housing when cutting. The support member is fixed to a guide member which extends parallel to and adjacent the cutting blade where it protrudes from the free end of the housing.

10 Claims, 5 Drawing Sheets

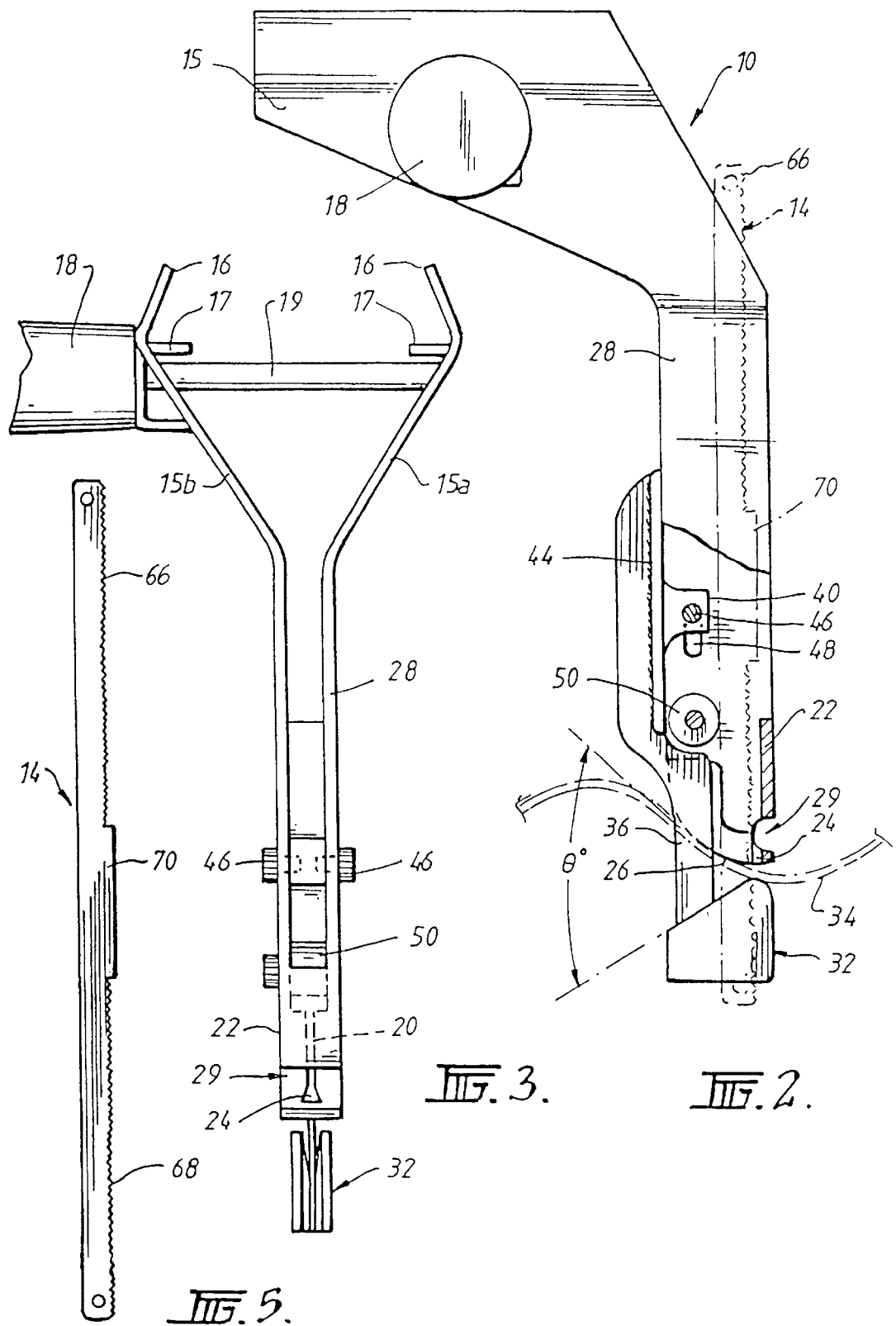

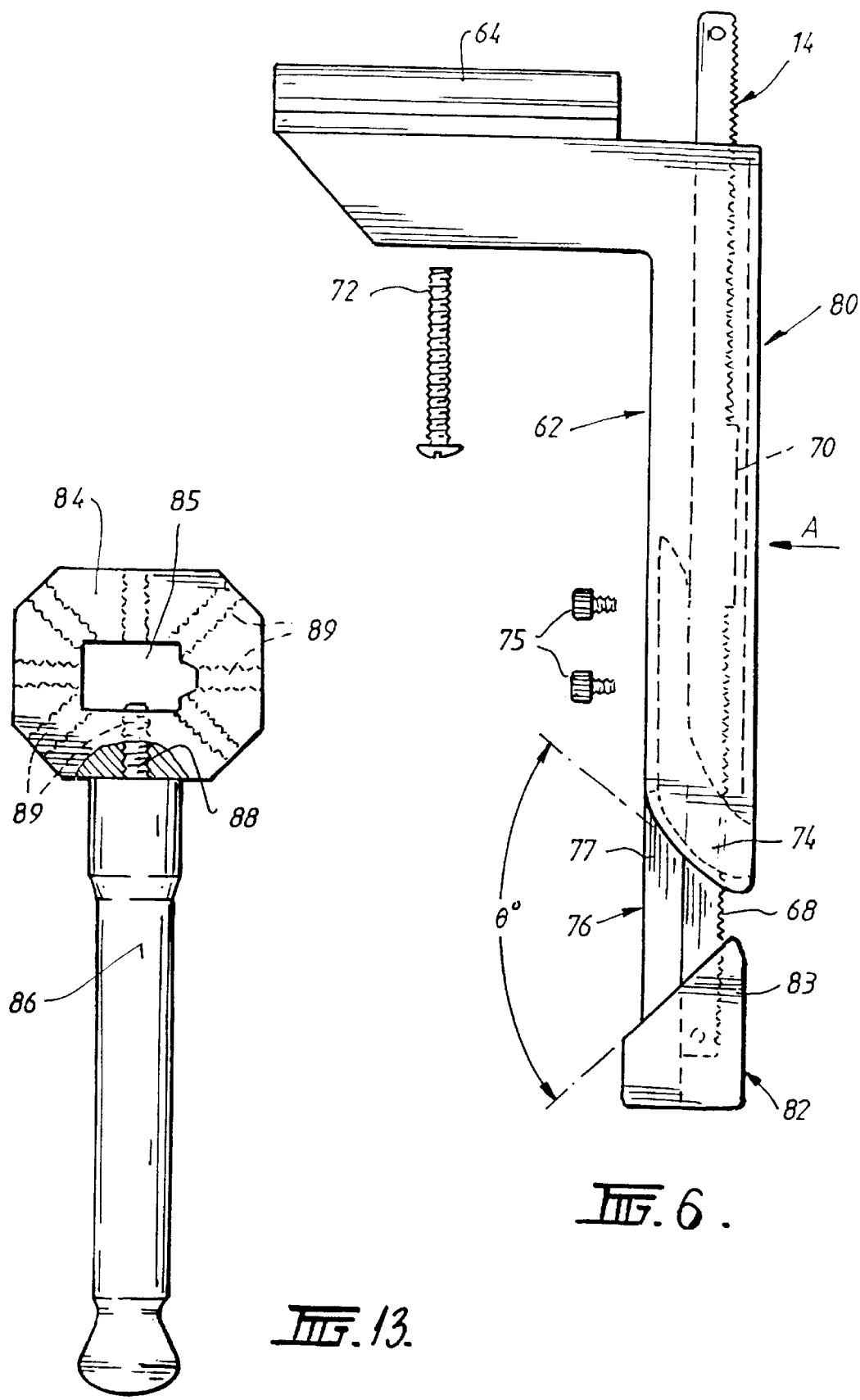

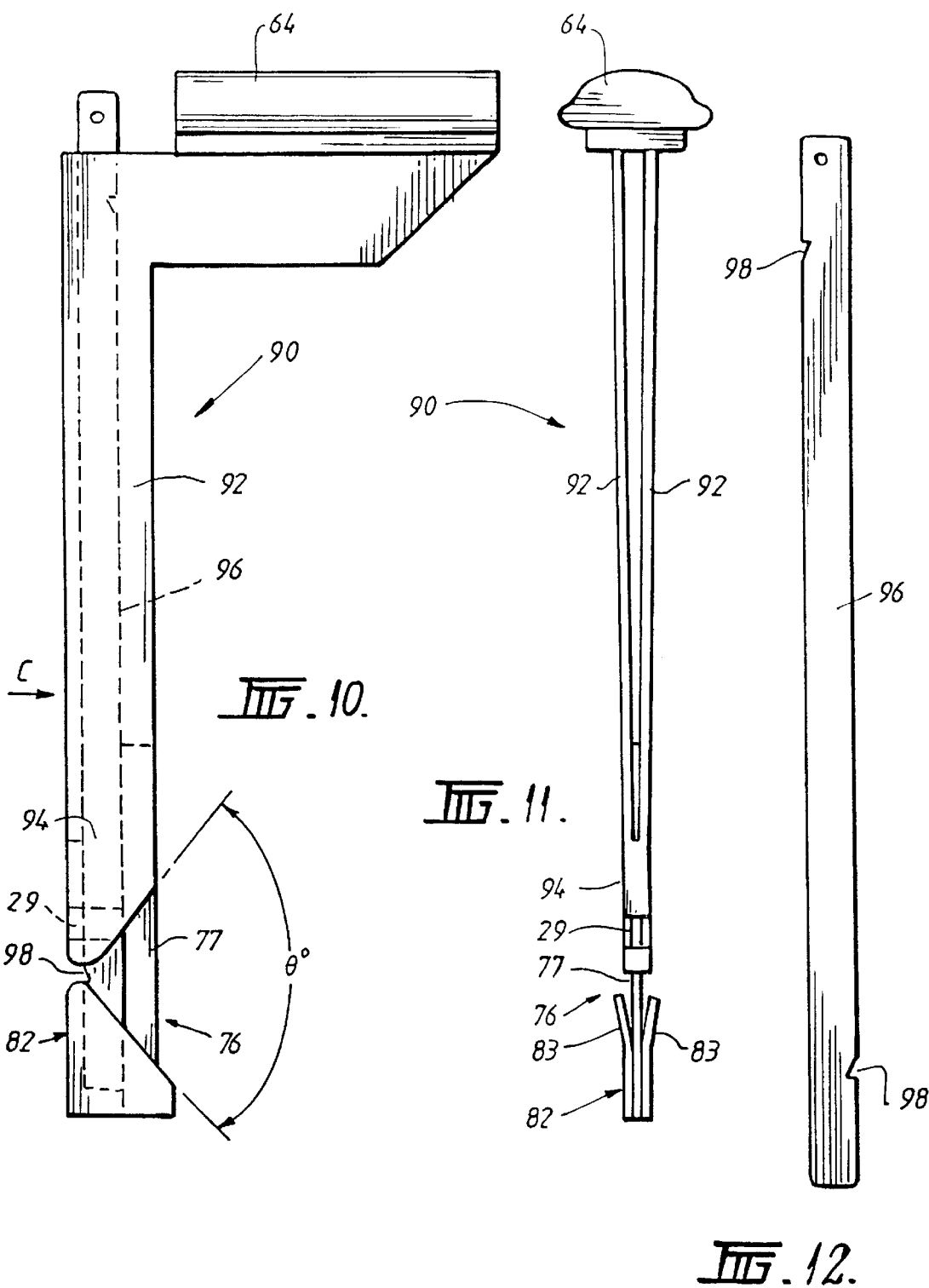

CUTTING TOOL

FIELD OF THE INVENTION

The present invention relates to a cutting tool and relates more particularly, but not exclusively, to a cutting tool which takes the form of an attachment for an electric jigsaw.

BACKGROUND TO THE INVENTION

Australian Patent No. 650533 describes a nibbler tool designed to be attached to the chuck of an electric drill. The nibbler tool includes a clamp for clamping the tool to the nose portion of an electric drill. The tool has a hollow barrel with a longitudinally extending circular bore and slot having mounted therein a shuttle in the form of a cylindrical rod. A cutting anvil formed of hardened steel is mounted at one end of the barrel and is provided with a slot in alignment with the longitudinally extending slot of the barrel. A nibbler blade is attached to the shuttle which is adapted for reciprocating movement within the barrel by means of an attachment fitted to the drill chuck. A longitudinally adjustable foot is mounted on the barrel but is spaced therefrom by a foot blade. The foot enables the nibbler tool to cut shaped material such as corrugated iron.

The nibbler tool described in Australian Patent No. 650533 is the only tool currently available for cutting shaped material such as corrugated iron. However, there are a number of significant disadvantages with this tool. Firstly, the saw comprises a large number of parts, many of which must be individually machined, thus greatly increasing the overall cost and complexity of the tool. The slot provided in the anvil must be high precision cut to ensure that the nibbler blade provides a clean cut in the work piece. Furthermore, cutting is relatively slow as the nibbler blade only takes one nibble for each stroke of the blade. The sliding movement of the shuttle within the barrel and the blade within the slot of the anvil requires constant lubrication in order to reduce friction and heating of the tool.

Although the adjustable foot helps to retain the work piece in the vicinity of the nibbler blade, it does not provide adequate support for the work piece, which is still subject to significant vibration during cutting action of the nibbler tool. The work piece must typically be supported on a foam pad or the edge of a table or work bench. Hence, the nibbler tool of Patent No. 650533 is not sufficiently reliable and easy to use by tradesmen such as roofing specialists, who need to be able to cut corrugated iron in situ.

SUMMARY OF THE INVENTION

The present invention was developed with a view to providing a cutting tool of simple construction which is easy to use and which can reliably cut shaped material such as corrugated iron.

According to one aspect of the present invention there is provided a cutting tool comprising:

an elongate cutting blade;
an elongate housing adapted to slidably receive therein the cutting blade driven in a reciprocating manner, the housing having a blade support provided at a free end thereof in which the cutting blade is slidably supported, the housing being shaped so that the cutting blade does not engage the housing anywhere else along substantially its full length; and,
a work piece support extending from the free end of the housing and having a support member arranged to engage a work piece in a stabilising manner adjacent the free end of the housing when the cutting blade is cutting through the work piece in use.

Preferably said work piece support further comprises a thin elongate guide member connected to the housing and extending parallel to and adjacent the cutting blade where it protrudes from the free end of the housing, and arranged so as to pass through a cut in the work piece formed by the cutting blade and having the support member mounted thereon underneath the work piece. In a preferred embodiment said guide member also acts as a guide for the cutting blade and is adapted to receive the cutting blade in sliding engagement therewith whereby, in use, as the teeth on a front cutting edge of the cutting blade engage with the work piece, a rear edge of the cutting blade is slidably supported on said guide member.

Preferably said guide member is movably connected to the housing so that the length of the guide member extending from the free end of the housing can be adjusted, whereby the distance said support member is spaced from the free end of the housing is adjustable.

Advantageously said blade support is formed integral with said guide member, and comprises first and second guide walls forming a guide channel within which said cutting blade is slidably received.

In one embodiment said elongate housing is of rectangular cross-section and is adapted to fully enclose the cutting blade along the length of the housing. Advantageously said housing is formed with an aperture adjacent the free end through which any shavings drawn into the housing by the cutting blade can be ejected.

In another embodiment said elongate housing comprises a pair of rigid legs joined at both the free end of the housing and at the opposite end, said cutting blade being slidably received between the two legs.

Preferably said housing is adapted to be mounted on an electric jigsaw and said cutting blade is driven by the jigsaw in the same manner as a conventional jigsaw blade.

BRIEF DESCRIPTION OF THE DRAWINGS

In order to facilitate a more comprehensive understanding of the nature of the invention preferred embodiments of the cutting tool will now be described in detail, by way of example only, with reference to the accompanying drawings in which:

FIG. 3 is a front view of the cutting tool of FIG. 1;

FIG. 4 is a side view of a work piece support of the cutting tool in FIG. 1;

FIG. 5 is a side view of a cutting blade for the cutting tool of FIG. 1;

FIG. 6 is a side view of a second embodiment of the cutting tool;

FIG. 10 is a side view of a third embodiment of the cutting tool;

FIG. 11 illustrates the cutting tool viewed in the direction of arrow C in FIG. 10; and FIG. 12 is a side view of the cutting blade for the cutting tool of FIGS. 10 and 11; and, FIG. 13 illustrates a removable handle that can be used with the cutting tool of FIG. 6.

DETAILED DESCRIPTION OF PREFERRED EMBODIMENTS

Figure 1:
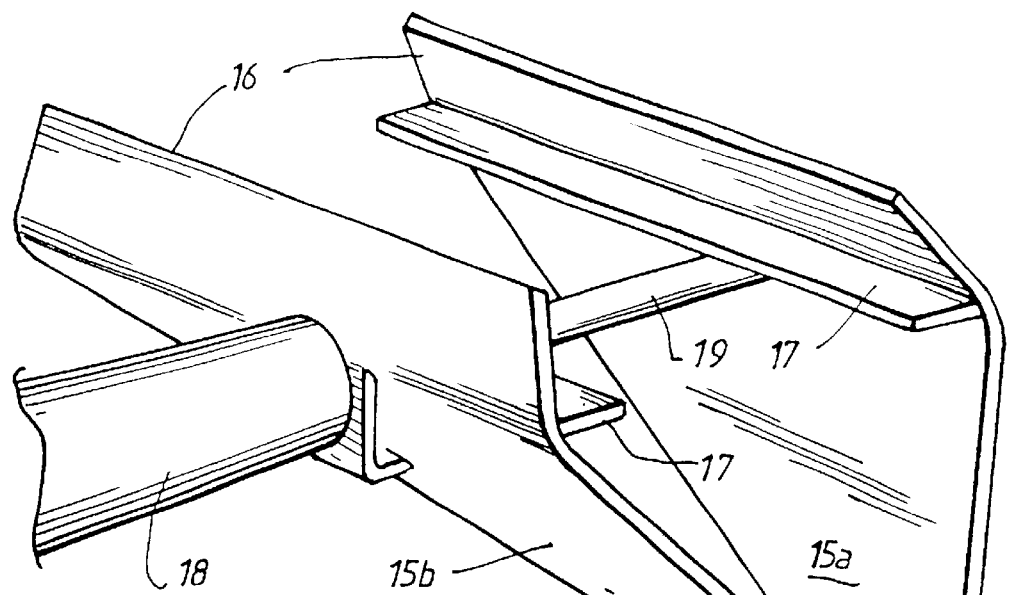
FIG. 1 is a perspective view of a first embodiment of the cutting tool.

A first embodiment of the cutting tool 10 according to the invention as shown in FIGS. 1 to 4 comprises an elongate housing 12 adapted to slidably receive therein a cutting blade 14. This embodiment of the cutting tool 10 is in the form of an attachment for an electric jigsaw, (not illustrated) and the housing 12 therefore incorporates a pair of claiming brackets 15 for mounting the housing on a footplate of a jigsaw (not shown). Each bracket 15 of the housing is provided with a mounting flange 16 of a shape adapted to clamp onto the footplate of the jigsaw when a compressive force is applied to move the clamping brackets towards each other. A ledge 17 provided adjacent each mounting flange 16 provides additional support for the housing on the jigsaw footplate. A compressive force is applied to the clamping brackets 15 by way of a handle 18 which is provided by screw-threaded attachment on a rod 19. Rod 19 is fixed at one end to an inside face of one of the clamping brackets 15a and extends through an aperture in the other clamping bracket 15b. Handle 18 is screwed onto a threaded portion of the rod 19 that protrudes through the aperture until it abuts against an outer face of the clamping bracket 15b, as can be seen most clearly in FIG. 3. By tightening handle 18 on rod 19 against the outer face of the clamping bracket 15b, the two clamping brackets are drawn towards each other to produce a clamping force on the jigsaw footplate. With this simple arrangement the cutting tool 10 can be fitted to the footplate of any conventional portable jigsaw.

The cutting blade 14 is driven by the jigsaw in a reciprocating manner similar to a conventional jigsaw blade. The housing 12 has an aperture 20 provided at a free end 22 thereof through which the cutting blade 14 protrudes. The aperture 20 is in the form of a slot and has an enlarged portion 24 formed in an end face 26 of the free end 22 of the housing, within which the teeth of the cutting blade 14 are free to move without engaging the walls of the housing. At the opposite end of the housing 12 the other end of blade 14 is unsupported, as can be seen most clearly in FIG. 2, where it protrudes for connection to the jigsaw. In this embodiment the upper portion of the housing comprises a pair of legs 28 which are sufficiently strong and rigid to house the cutting blade 14 in operation, but retain a degree of resiliency to permit sufficient flexing of the respective clamping brackets 15 that extend from the upper extremities thereof. An enlarged aperture 29 is formed in a front face of the free end 22 of the housing 12 and is designed to allow any shavings or metal filings cut from the work piece in use, and which may collect within the housing 12, to be removed (see FIG. 2).

Figure 2:
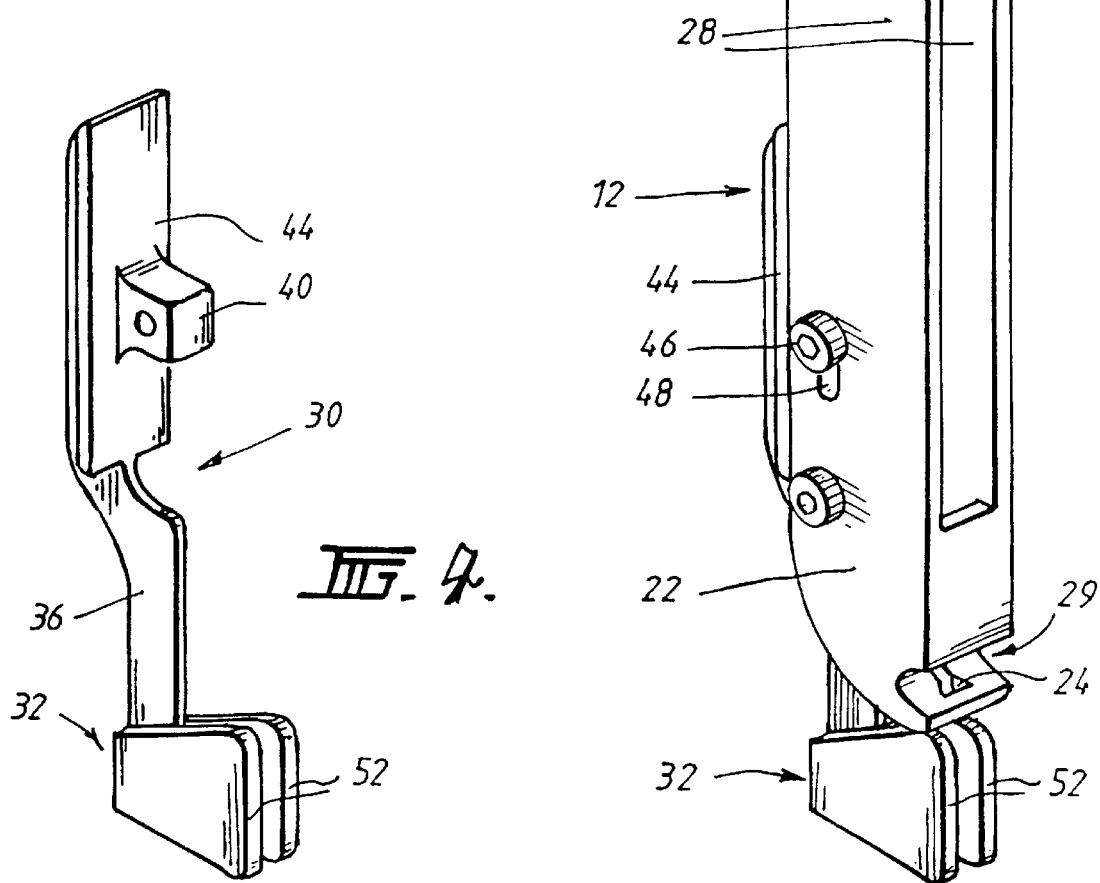
FIG. 2 is a side view of the cutting tool of FIG. 1.

The cutting tool 10 further comprises a work piece support 30 extending from the free end 22 of the housing, and having a support member 32 arranged to engage a work piece in a stabilising manner adjacent the free end 22 of the housing 12 when the cutting blade 14 is cutting through the work piece in use. In FIG. 2 a shaped work piece in the form of a length of corrugated iron 34 is shown in broken outline. The support member 32 engages an undersurface of the corrugated iron 34 and supports it against the free end of the housing 12 so as to hold the corrugated iron in a stabilising manner during cutting action of the cutting blade 14. Because of the arrangement of the support member 32 the cutting tool 10 can be made to follow the curved profile of the shaped work piece 34 without in any way adversely affecting the cutting action of the cutting blade 14. On the contrary, the support member 32 of the work piece support holds the work piece in a stable manner relative to the housing 12, and hence relative to the jigsaw to which it is attached, so that the cutting action of the cutting blade 14 is enhanced.

In this embodiment of the cutting tool 10 the work piece support 30 further comprises a thin guide member 36 illustrated more clearly in FIG. 4. The guide member 36 is connected to the housing 12 and extends parallel to and adjacent the cutting blade 14 where it protrudes from the free end 22 of the housing. The guide member 36 is of approximately the same thickness or slightly thinner than the cutting blade 14 and is arranged to pass through a cut in the work piece 34 formed by the cutting blade 14 in use.

In this embodiment a guide roller 50 rotatably supported within the housing, acts as a guide for the cutting blade 14 and is adapted to receive the cutting blade 14 in sliding engagement therewith as can be seen most clearly in FIG. 2. As the teeth on the front cutting edge of the cutting blade 14 engage with the work piece in use, the rear edge of the cutting blade 14 is slidably supported on the guide roller 50. Guide member 36 and guide roller 50 together form a blade support on which the cutting blade 14 is slidably supported in use. The housing 12 is of rectangular cross-section and is shaped so that the cutting blade does not engage the housing anywhere along substantially its full length other than on the blade support. Hence, friction between the cutting blade and the housing is minimised.

As can be seen most clearly in FIG. 2, the upper part of guide member 36 is received within the hollow confines of the free end 22 of the housing 12. Advantageously, the guide member 36 can be disconnected from the housing 12 and replaced should it become damaged. For this reason, the free end 22 of the housing is formed with an elongate aperture 29, as shown in FIG. 3, through which the guide member 36 can be inserted or withdrawn during assembly or disassembly. Guide member 36 is provided with a mounting plate 44 welded thereto and extending perpendicular to the plane of the guide member 36. Mounting plate 44 is fastened to the housing 12 by means of mounting screws 46 as shown in FIGS. 1 and 3. Mounting screws 46 pass through a wall of the housing 12 into a mounting block 40 provided on the mounting plate 44. A slot 48 provided in the wall of the housing permits the position of the work piece support 30, and hence the length of the guide member 36 which protrudes from the free end 22 of the housing to be adjusted. Clearly, guide member 36 may be made of any suitable length and the support member 32 arranged so that the work piece support can accommodate work pieces of varying thicknesses. With the arrangement illustrated in FIG. 2, a work piece up to 10 mm thick may be supported and cut.

As can be seen most clearly in FIGS. 1 and 4, the support member 32 of this embodiment is in the form of an enlarged foot having first and second side walls 52 which extend towards the free end 22 of the housing on each side of the cutting blade 14 respectively. In this embodiment the first and second side walls 52 are fixed to the guide member 36 and provide additional support against lateral movement of the free end of the cutting blade 14 during use. Preferably the side walls 52 are shaped so that the support member 32 has a smoothly curved profile in the region where it engages the work piece adjacent the free end 22 of the housing. The first and second side walls 52 of support member 32 engage the work piece on each side respectively of the cut being formed by the cutting blade in use, thus supporting the material of the work piece on both sides of the cut in a stabilising manner.

As shown in FIG. 1, the first and second side walls 52 of the support member 32 extend obliquely to the cutting edge of the cutting blade 14 and the end face 26 of the free end 22 of the housing also extends obliquely to the cutting edge, so that the side walls 52 and end face 26 together subtend an angle of θ°. The angle θ° is preferably between 80° and 150° and is designed to allow the cutting tool 10 to follow the profile of a shaped work piece, such as the corrugated iron 34 shown in FIG. 1. Hence, the angle of orientation of the cutting tool 10 with respect to the work piece may be kept substantially constant, which enhances ease of operation and helps to minimise operator fatigue.

In some applications of the cutting tool it may be preferred to dispense with the work piece support 30.

The cutting blade 14 employed with the cutting tool 10 may be a standard jigsaw blade. However, preferably the cutting blade 14 is custom designed for the cutting tool, as shown in FIG. 5. The preferred embodiment of the cutting blade 14 illustrated in FIG. 5 is significantly longer than a standard jigsaw blade so as to extend through the full length of the housing 12. Furthermore, the cutting blade 14 is preferably double sided having first and second cutting edges 66, 68 provided on respective sides of a non-cutting intermediate portion 70. The cutting edges of the cutting blade 14 are formed with conventional saw teeth of hardened steel, which may be diamond coated or tungsten carbide tipped for additional hardness if required. The intermediate portion 70 extends above the line of the teeth of the cutting edges 66, 68, so that should the cutting blade 14 be pushed forward in use the intermediate portion 70 will engage with the inner surface of the housing 12, rather than the cutting edges 66, 68. Advantageously, the cutting blade 14 is reversible so that when one of the cutting edges 66, 68 becomes blunt, the blade can be reversed and the other cutting edge employed.

A second embodiment of the cutting tool 80 according to the invention is shown in FIGS. 6 to 9. The cutting tool 80 of this embodiment comprises an elongate housing 62 adapted to slidably receive a cutting blade 14 therein. The housing 62 is in the form of an L-shaped mounting bracket as can be seen most clearly in FIG. 6. One portion of the housing is provided with a mounting flange 64 of a shape adapted to be mounted on a bottom face of a jigsaw (not illustrated), by a mounting screw 72. The housing has an aperture provided at a free end 74 thereof through which the cutting blade 14 protrudes similar to that of the first embodiment. The cutting tool 80 further comprises a work piece support 76 extending from the free end 74 of the housing, and having a support member 82 mounted thereon. Work piece support 76 is similar to the work piece support 30 of the first embodiment. It includes a guide member 77 similar in function to guide member 36 of the first embodiment.

Figure 7:
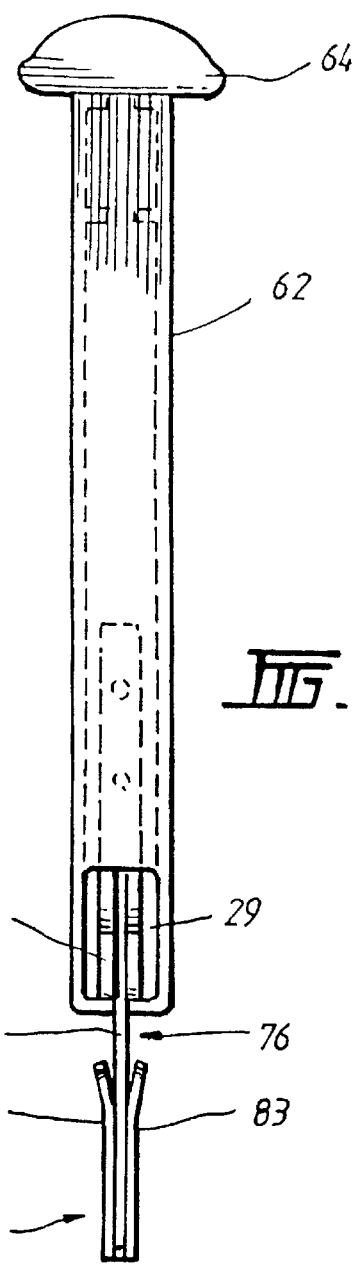
FIG. 7 illustrates the cutting tool viewed in the direction of arrow A in FIG. 6.
Figure 8:
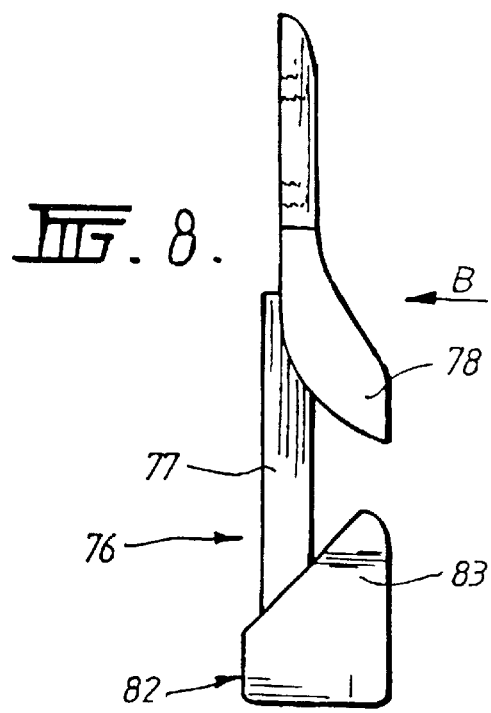
FIG. 8 is a side view of the work piece support of the cutting tool in FIG. 6.
Figure 9:
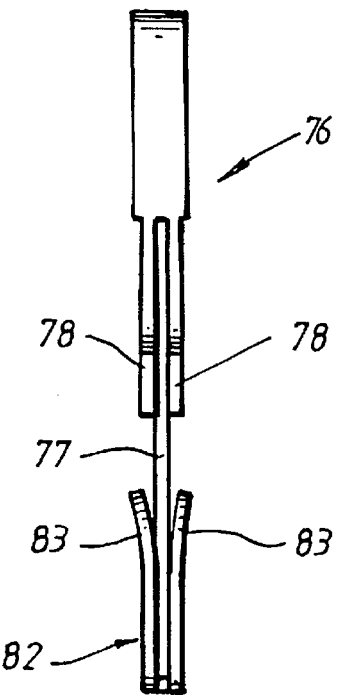
FIG. 9 is a plan view of the work piece support shown in FIG. 8 viewed in the direction of arrow B.

In this embodiment the support member 82 is in the form of an enlarged foot having first and second side walls 83 which can be seen most clearly in FIGS. 7 and 9. Side walls 83 are fixed to the guide member 77 and extend on respective sides of the cutting blade 14 to provide additional support against lateral movement of the free end of the cutting blade 14 during use. As can be seen most clearly in FIGS. 6 and 8 one edge of the side walls 83 extends obliquely to the cutting edge of the cutting blade 14 so that together with the end face of the free end 74 of the housing they subtend an angle of θ°, similar to the angle θ° shown in FIG. 1.

In this embodiment the guide member 77 is also removably mounted within the free end 74 of the housing 62, except in this case the guide member is fastened to the housing 62 by mean of two mounting screws 75 as shown in FIG. 6. Also, as can be seen most clearly in FIG. 8, a pair of guide walls 78 on the workpiece support 76 form a guide channel within which the rear edge of the cutting blade 14 is slidably received in use. Guide member 77 and the guide channel together form a blade support in which the cutting blade is slidably supported in use. Preferably, elongate holes are provided in the wall of the housing 12 through which the fasteners 75 extend so that the position of the guide member 77 can be longitudinally adjusted whereby the length of the guide member extending from the free end of the housing can be adjusted. In this way, the spacing of support member 82 from the free end 74 of the housing can be adjusted to suit the particular work piece being cut.

FIG. 13 illustrates a removable handle 86 which may be removably mounted on the housing 62 by means of a handle support 84 to allow the cutting tool to be supported in use with the operator's free hand. Handle 86 is provided with a threaded spindle 88 which is received in screw-threaded engagement in any one of a plurality of threaded apertures 89 in the handle support 84. The housing 62 is slidably received within a central aperture 85 of the handle support 84, and the handle support may be locked to the housing 62 by twisting handle 86 so that spindle 88 protrudes through one of the apertures 89 and engages the housing 62. The plurality of apertures 89 allow the handle 86 to be fixed at a variety of angles relative to the housing 62.

FIGS. 10 to 11 illustrate a third embodiment of the cutting tool 90 in accordance with the invention. This embodiment is also similar to the previous embodiments in certain respects, and similar parts are marked with the same reference numerals and will not be described again in detail. In this embodiment the elongate housing is formed by a pair of legs 92 formed of suitably rigid material and joined at both the free end 94 of the housing and at the opposite end where the housing is fixed to the mounting flange 64. In FIG. 11 the cutting blade has been omitted for clarity, however as can be seen in FIG. 10 a cutting blade 96 is slidably received between the two legs 92. In this embodiment the work piece support 76 is of similar construction to the work piece of the second embodiment illustrated in FIGS. 6 to 9, except that in this case the guide member 77 is fixed (welded) to the free end 94 of the housing formed by legs 92. Furthermore, in this embodiment the legs 92 in the region of the free end 94 of the housing act as guide walls for the blade 96 and form a guide channel which together with the guide member 77 form a blade support as in the previous embodiment.

Although a conventional jigsaw blade may still be used in this embodiment, the blade 96 illustrated is provided with only a single notch or tooth 98 specially designed for cutting or nibbling through a work piece (not illustrated). In use, the tooth 98 of blade 96 will cut through the work piece on the upward stroke. The cutting tool of FIGS. 10 to 12 is designed specifically for cutting through corrugated iron and therefore the spacing between the support member 82 and the free end 94 of the housing is fixed.

Now that preferred embodiments of the cutting tool 10 have been described in detail it will be apparent that it has a number of significant advantages over the prior art nibbler tool, including the following:

(i) it only has a few component parts and therefore is relatively easy to assemble and inexpensive to manufacture;

(ii) friction between moving parts is minimised so that little or no lubrication is required;

(iii) it can be provided as an attachment for a conventional jigsaw on which it can be mounted with only one mounting screw;

(iv) it is lightweight and can be operated with one hand with minimal operator fatigue;

(v) the saw tooth cutting edge provides rapid cutting action;

(vi) the arrangement of the work piece support allows a shaped work piece such as corrugated iron to be cut with ease; and, (vii) no additional support for the work piece is required so that the cutting tool can be used in situ, eg. on the roof of a house.

Numerous variations and modifications to the described embodiments of the cutting tool will suggest themselves to persons skilled in the mechanical arts, in addition to those already described, without departing from the basic inventive concepts. For example, the cutting tool need not be made in the form of an attachment for a conventional jigsaw, but may be provided as a specialist tool with its own motor for driving the cutting blade in a reciprocating manner. All such variations and modifications are to be considered within the scope of the present invention, the nature of which is to be determined from the foregoing description and the appended claims.

What is claimed is:

1. A cutting tool comprising:

an elongate cutting blade;

an elongate housing adapted to slidably receive therein the cutting blade driven in a reciprocating manner, the housing having a blade support provided at a free end thereof in which the cutting blade is slidably supported, the housing being shaped so that the cutting blade does not engage the housing anywhere else along substantially its full length; and, a work piece support extending from the free end of the housing and having a support member arranged to engage a work piece in a stabilising manner adjacent the free end of the housing when the cutting blade is cutting through the work piece in use.

2. A cutting tool as defined in claim 1, wherein said work piece support further comprises a thin elongate guide member connected to the housing and extending parallel to and adjacent the cutting blade where it protrudes from the free end of the housing, and arranged so as to pass through a cut in the work piece formed by the cutting blade and having the support member mounted thereon underneath the work piece.

3. A cutting tool as defined in claim 2, wherein said guide member also acts as a guide for the cutting blade and is adapted to receive the cutting blade in sliding engagement therewith whereby, in use, as the teeth on a front cutting edge of the cutting blade engage with the work piece, a rear edge of the cutting blade is slidably supported on said guide member.

4. A cutting tool as defined in claim 3, wherein said guide member is movably connected to the housing so that the length of the guide member extending from the free end of the housing can be adjusted whereby the distance said support member is spaced from the free end of the housing is adjustable.

5. A cutting tool as defined in claim 1, wherein said support member comprises first and second side walls which extend towards the free end of the housing on each side of the cutting blade respectively, so as to engage the work piece on each side respectively of the cut being formed by the cutting blade in use.

6. A cutting tool as defined in claim 5, wherein one edge of the side walls extends obliquely to the cutting edge of the cutting blade so that together with an end face of the free end of the housing they subtend an angle of θ°, wherein the angle θ° is preferably between 80° and 150° and is designed to allow the cutting tool to follow the profile of a shaped work piece.

7. A cutting tool as defined in claim 1, wherein said housing is formed with first and second clamping brackets for mounting the housing on a footplate of a jigsaw.

8. A cutting tool as defined in claim 7, wherein each clamping bracket is provided with a mounting flange of a shape adapted to clamp onto the footplate of the jigsaw when a compressive force is applied to move the clamping brackets towards each other.

9. A cutting tool as defined in claim 7, wherein said elongate housing is of rectangular cross-section and is adapted to fully enclose the cutting blade along the length of the housing.

10. A cutting tool as defined in claim 1, wherein said housing is formed with an aperture adjacent the free end through which any shavings drawn into the housing by the cutting blade can be ejected.

* * * * *